Oct. 14, 1958   C. G. GRIFFITH ET AL   2,855,664
METHOD OF MACHINING HONEYCOMB CORE

Filed Dec. 21, 1955   4 Sheets-Sheet 1

INVENTORS.
C. G. GRIFFITH
T. A. HERBERT JR.
BY
ATTORNEY

Oct. 14, 1958     C. G. GRIFFITH ET AL     2,855,664
METHOD OF MACHINING HONEYCOMB CORE
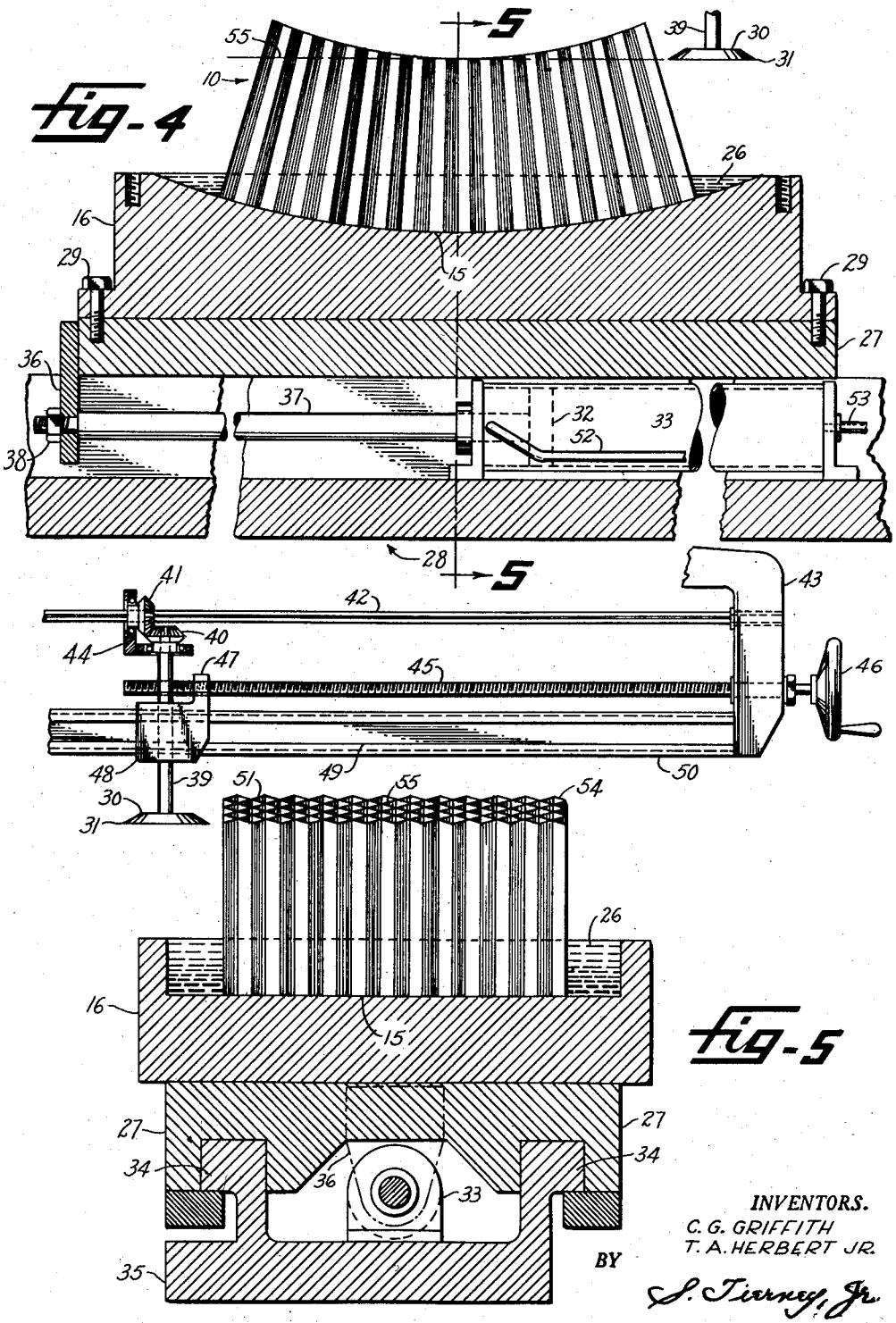
INVENTORS.
C. G. GRIFFITH
T. A. HERBERT JR.
BY
S. Tierney, Jr.
ATTORNEY INVENTORS.
C. G. GRIFFITH
T. A. HERBERT JR.
BY
S. Tierney Jr.
ATTORNEY Oct. 14, 1958   C. G. GRIFFITH ET AL   2,855,664
METHOD OF MACHINING HONEYCOMB CORE Filed Dec. 21, 1955   4 Sheets-Sheet 4

INVENTORS.
C. G. GRIFFITH
T. A. HERBERT JR.
BY
S. Tierney Jr.
ATTORNEY

# United States Patent Office 2,855,664
Patented Oct. 14, 1958

2,855,664

METHOD OF MACHINING HONEYCOMB CORE

Charles G. Griffith, San Diego, and Thomas A. Herbert, Jr., Chula Vista, Calif., assignors to Rohr Aircraft Corporation, Chula Vista, Calif., a corporation of California Application December 21, 1955, Serial No. 554,490

7 Claims. (Cl. 29—424)

This invention relates to the machining of honeycomb core composed of a plurality of interconnected cells to a desired contour.

Honeycomb core in which the cells are made of aluminum or stainless steel strips having a thickness of from .001 to .005 inch has come into use for making parts of airplanes. As usually made the strips are of the same width so that the resulting core has plane top and bottom faces which are parallel to each other. It is a main object of our invention to provide a method for machining such core that one or both faces thereof may be shaped to any desired contour.

Another object is to provide a method for securing a curved contour on honeycomb core by making one or more straight cuts across the top thereof.

A further object is to provide a method for machining honeycomb core while the bottom face of the core is distorted out of its normal shape and anchored against the face of a curved die which serves as a support for the core during the machining.

Further objects will become apparent as a description of a core cutting machine proceeds. For a better understanding of the invention reference is made to the accompanying drawings, in which:

Fig. 4 is a longitudinal view partly in section showing portions of a milling machine for cutting honeycomb core with a core prior to cutting;

Fig. 5 is a transverse sectional view taken on line 5—5 of Fig. 4;

Figure 1:
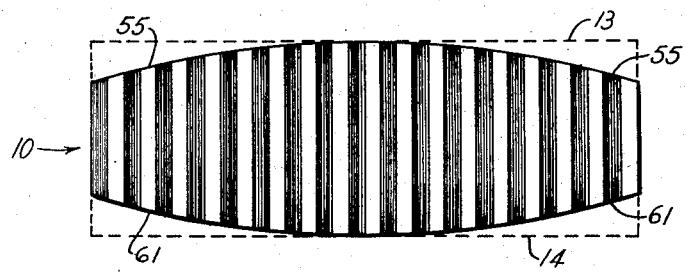
Fig. 1 is a front view of a honeycomb core whose upper and lower curved faces were cut by our novel method, the original shape of the core being indicated by dash lines.
Figure 2:
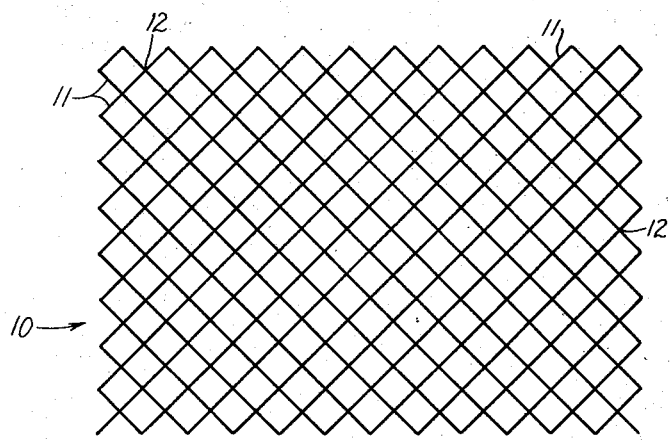
Fig. 2 is a top view of the core of Fig. 1 before cutting.
Figure 3:
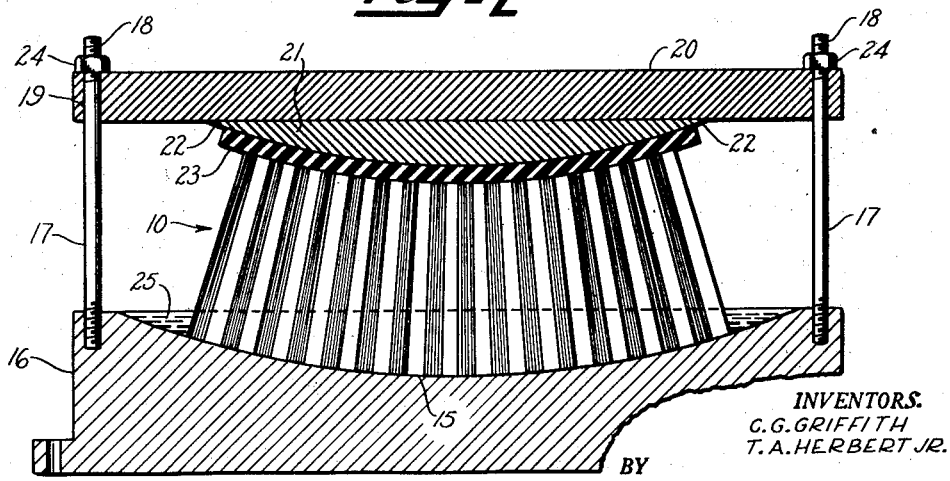
Fig. 3 is a view partly in section of a clamp with a honeycomb core therein.

Referring to Figs. 1 to 3, a rectangular honeycomb core 10 is shown having vertical cell walls 11 connected together at their nodes 12. The cells may be connected at their nodes by spotwelds, brazing metal, adhesive material or other known means. The core shown has a flat top face 13 which is parallel to its bottom face 14, though it is not necessary that these faces be parallel to practice the invention. A core of this type is flexible when made of aluminum or stainless steel strips having a thickness of from .001 to .005 inch and may be bent so that its bottom face 14 may be pressed against the smooth concave face 15 of a rigid metal die 16. The face 15 is cylindrical, that is, a parallel set of spaced apart straight lines may be drawn on it in a direction normal to the paper in Fig. 3. The die is provided along its front and rear ends with four or more upstanding bolts 17 (two only being shown) whose upper ends 18 are threaded and pass through holes 19 in a cover 20. Under cover 20 is a form plate 21 whose lower face 22 is cylindrical and substantially parallel to die face 15. Interposed between face 22 and the top face 13 of core 10 is a rubber pad 23. As the nuts 24 threaded onto the ends 18 of bolts 17 are tightened, core 10 progressively bends until its lower face 14 assumes a cylindrical shape and lies against the concave die face 15. The pad 23 distributes the pressure uniformly on the core and assures the lower end of each cell being held in contact with die face 15. Water is then poured into the die cavity to form a pool 25 which wets die face 15 and fills the lower end of all the cells. The water is then frozen to form a continuous mass of ice 26 (Figs. 4 and 5) which fastens the bent core securely to die 16. The freezing may be done in any convenient manner such as placing the assembly in a refrigerated chamber (not shown) having a temperature of 0° F. When the die 16 and ice have reached a temperature several degrees below 32° F., the assembly is removed from the chamber, and bolts 17 along with cover 20, form plate 21 and pad 23 removed. A thin coat of jelly made of Ivory soap dissolved in water is smeared along the top portion of all the cells to serve as a cutting lubricant.

A horizontal cut is now made across the top of bent core 10, by attaching die 16 to the movable table 27 (Figs. 4 and 5) of a milling machine 28 by a set of bolts 29. Table 27 is advanced slowly toward a milling cutter 30 having a sharp circular edge 31 by a piston 32 movable in a longitudinal cylinder 33. Table 27 is slidable along a pair of straight parallel guideways 34 integral with the main bed 35 of the machine. One end of table 27 has a depending leg 36 which is connected to piston 32 by piston rod 37 and a nut 38 on the threaded end of the rod. Cutter 30 is rotated at a high speed by vertical shaft 39 to the end of which it is attached, this shaft being driven by bevel gear 40 which meshes with bevel gear 41 splined to and slidable along horizontal shaft 42. Shaft 42 is rotated by any suitable means such as an electric motor (not shown) and one end of the shaft is journaled in a stationary bracket 43. Gears 40, 41 are journaled in a support 44 which is moved back and forth by a threaded screw 45 having a hand drive wheel 46. Screw 45 engages a threaded lug 47 attached to a slide 48 which is guided horizontally by horizontal guideway 49 formed in a long bar 50, one end of which is attached to the lower end of bracket 43. The other end of bar 50 (not shown) is attached to a fixed support. Vertical shaft 39 is also journaled in slide 48 so that as hand wheel 46 is rotated, cutter 30 may be advanced in either direction parallel to guideway 49.

With piston 32 and cutter 30 in the positions shown in Figs. 4 and 5, hand wheel 46 is rotated to move cutter 30 to the right in Fig. 5 until it lies opposite the edge portion 51 of core 10. Air or liquid under pressure from pipe 52 is then admitted to the end of cylinder 33 causing piston 32 to move and advance the edge portion 51 against cutter 30. As the piston continues to move, a straight cut having a width somewhat less than half the diameter of the cutting edge 31 is made along the top of core 10. After the cutter has left the core, handwheel 46 is rotated to advance the cutter 30 further toward the right (Fig. 5) and pressure fluid from pipe 53 is admitted into the opposite end of cylinder 33. This causes core 10 to be moved toward the left (Fig. 4) and a second horizontal cut to be made through the top of the core. As the cutting proceeds the operator may place one end of a thin stick against the edge portion of the slice being removed from the core and bend the slice up so that it does not strike against shaft 39 and interfere with the passage of the core under the cutter. Having taken a second slice, handwheel 46 is again rotated to advance the next uncut portion of core into alignment with cutter 30 and a third cut made in the same manner as the first cut. This process is repeated until the right hand edge 54 has passed against the cutter and a thin slice of core been severed from the top of core 10. This leaves the bent core with a horizontal top face as indicated by the dash line in Fig. 4. Should the ice 26 start to melt during the cutting, small pieces of dry ice (not shown) may be laid thereon near the core 10 to keep it frozen. After the slice has been cut, the ice 26 is melted by heating it in any suitable manner when the core may be removed from die 16. The core bends up so that its bottom face 14 again becomes flat and its machined top face 55 is of cylindrical shape (Fig. 1).

Figure 6:
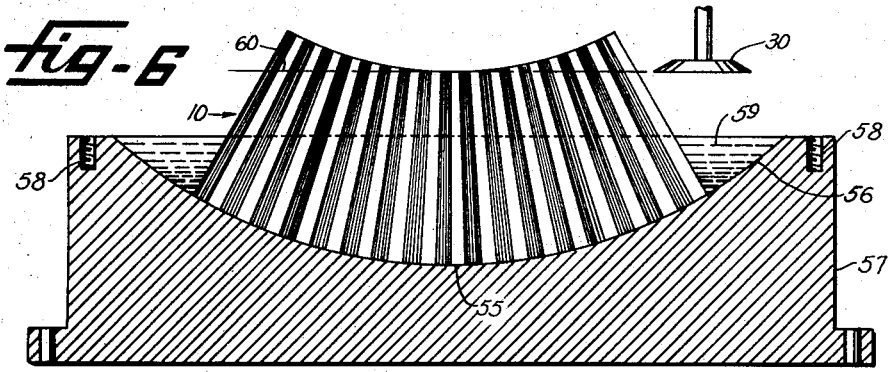
Fig. 6 is a longitudinal sectional view of a core in a second die ready for cutting in the machine shown in Figs. 4 and 5.
Figure 7:
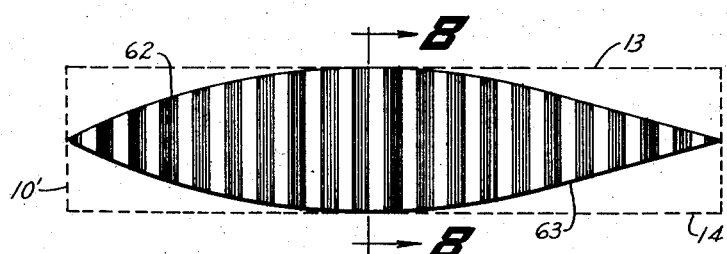
Fig. 7 is a front view of a honeycomb core cut on the machine shown in Figs. 4 and 5, the shape of the core before cutting being indicated by dash lines.
Figure 8:
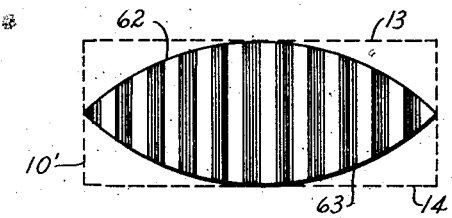
Fig. 8 is a transverse sectional view of the core of Fig. 7 taken on line 8—8.
Figure 9:
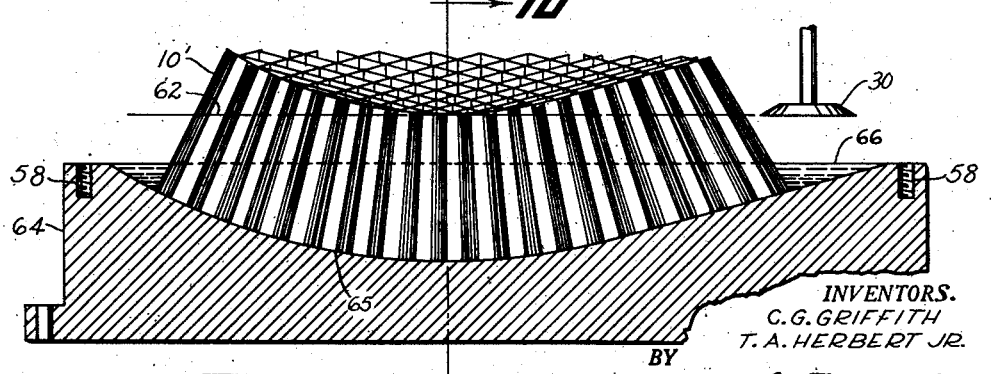
Fig. 9 is a longitudinal sectional view of a die with a core therein also showing a cutter.
Figure 10:
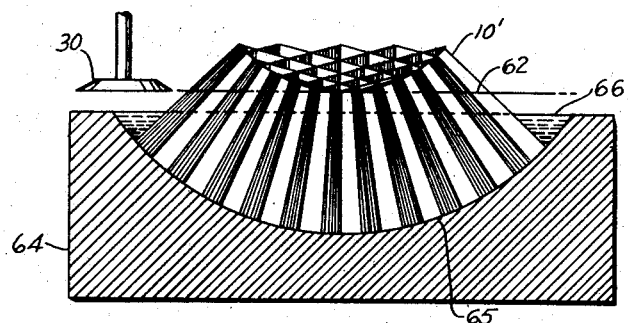
Fig. 10 is a transverse sectional view taken on line 10—10 of Fig. 9.

The core is now inverted and its face 55 placed against the cylindrical face 56 of a second die 57 (Fig. 6), face 56 having a shorter radius of curvature than die face 15. Rubber pad 23 (Fig. 3) is placed on top of the core, the bolts 17 screwed into the threaded holes 58 in the die, form plate 21, cover 20 put in position and the nuts 24 tightened in the same manner as above described in connection with Fig. 3. This bends the core down and causes its face 55 to temporarily assume the shape of die face 56. Water is then poured in the core and die and then frozen to make a block 59 of ice which anchors the core to the die. Cover 20, form plate 21, pad 23 and bolts 17 are then removed, die 57 secured to table 27 by bolts 29 (Fig. 4) and a straight cut made across the top of the core by cutter 30 in the same manner as above described. This leaves the bent core with a plane upper face as indicated at 60 (Fig. 6) which, upon melting the ice 59, assumes the cylindrical shape indicated at 61 in Fig. 1 while the bent face 55 returns to its cylindrical shape as indicated in Fig. 1. In certain instances a core may be required with only an upper cylindrical face 55, in which case the machining is complete after removing the core from die 16 (Fig. 4), the bottom face 14 of the core remaining flat.

Referring to Figs. 7 to 10, if a rectangular core 10' having flat top and bottom faces 13, 14 is to be machined to provide top and bottom faces 62, 63 of compound curvature, the core is placed on a die 64 whose top face 65 is concave and of compound curvature as shown. The lower face 14 of core 10' is pressed against die face 65 in the manner above described by tightening the nuts 24 on bolts 17 screwed into the threaded holes 58 in the die. Form plate 21 is modified for this purpose, its convex bottom face being of compound curvature and parallel to die face 65. Water is then poured in the die and frozen to provide a block of ice 66 which secures the bent core to die 64. After removing the bolts 17, the die is secured to table 27 and a straight cut made by cutter 30 across the top of the core in the manner above described. The core face 62 so produced has the desired double curvature shown in Figs. 7 and 8 when the core is released from die 64.

Figure 11:
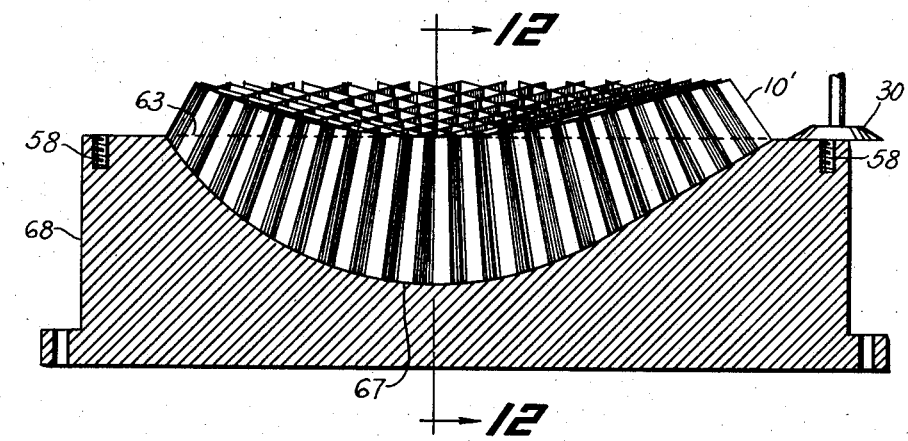
Fig. 11 is a longitudinal sectional view of a die with a core therein also showing a cutter.
Figure 12:
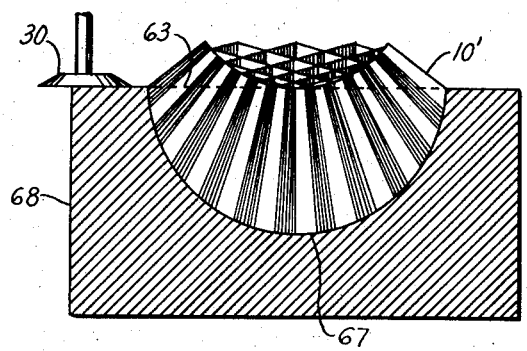
Fig. 12 is a transverse sectional view taken on line 12—12 of Fig. 11.

The core 10' is then inverted and its curved face 62 pressed against the curved face 67 (Figs. 11 and 12) of die 68 in the manner previously described. Face 67 is of compound curvature, as shown, and is of a depth such that the top face 63 will have the shape shown in Figs. 7 and 8 when the bent core is released from die 68. The die is then filled with water which is then frozen to anchor the bent core to the die. A straight cut is then made across the top of the core in the manner above described and the finished core released from the die. When inverted, the core has the shape shown in Figs. 7 and 8 with the walls of the core cells extending vertically.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. The method of shaping the top of a honeycomb core consisting of a plurality of open-ended interconnected cells having substantially vertical thin metal walls to a curved contour comprising the steps of placing the core on a die having a concave upper face; pressing down the top of the core to bend the core and force its bottom face against said concave die face; pouring liquid in the die to cover said concave die face and also the portion of the core adjacent said die face; freezing the liquid to provide a continuous frozen mass which fastens the core to said die; cutting a thin strip from the top only of the core while the bent core is fastened to said die to provide a horizontal top face on the core; and heating said frozen mass to liquify it and release the core from said die.

2. The method of providing curved convex faces along the top and bottom of a honeycomb core consisting of a plurality of open-ended interconnected thin-walled cells having vertical metal walls which comprises the steps of placing the core on a die having a concave curved upper face; pressing the top of the core to bend the core and force its bottom face against said concave die face; fastening the bent core to said die; cutting material from the top of the bent core to provide a plane top face thereon; releasing the bent core from said die; inverting the core; placing the convex bottom face of the inverted core on a second die having a concave curved upper face; pressing the top of the core to bend the core and force its bottom face against the upper face of said second die; fastening the bent core to said second die; cutting material from the top of the bent core to provide a plane top face thereon; and releasing the bent core from said second die.

3. The method set forth in claim 2, in which the plane top face cut on the core while fastened to said second die intersects the bottom convex face of the core.

4. The method of providing curved faces of compound curvature along the top and bottom of a honeycomb core consisting of a plurality of interconnected thin-walled cells which comprises the steps of placing the core on a die having a concave upper face of compound curvature; applying downward pressure to the core to bend the core and force its bottom face against said concave die face; pouring water in the die to cover said concave die face and also the portion of the core adjacent said die face; freezing the water to provide a block of ice which fastens the core to said die; cutting a thin slice from the top of the core to provide a plane top face thereon; heating said block of ice to melt it and release the core from said die; inverting the core; placing the inverted core on a second die having a concave upper face of compound curvature; applying downward pressure to the core to bend the core and force its bottom face against the concave face of said second die; pouring water in the second die to cover the portion of the core adjacent the concave face of said second die; freezing the water to provide a block of ice which fastens the core to said second die; cutting a thin slice from the top of the core to provide a plane top face thereon; and heating said last named block of ice to melt it and release the core from said second die.

5. The method of shaping the top portion of a honeycomb core consisting of a plurality of open ended cells having substantially vertical interconnected thin metal walls to a predetermined convex shape, which comprises the steps of pressing down the top of the core to bend the core and force the bottom face thereof into contact with the upper concave face of a die; bonding the bottom portion only of the bent core to the die while leaving the top portion of the core freely exposed; cutting material from the top of the bent core while the bottom portion thereof remains anchored to the die to provide a plane top face on the bent core; and releasing said bottom portion of the bent core from the die whereby the top face of the core assumes said predetermined convex shape.

6. The method of shaping the top of a honeycomb core consisting of a plurality of open-ended interconnected cells having substantially vertical thin metal walls to a convex contour of compound curvature which comprises the steps of placing the core on a die having a concave upper face of compound curvature; continually applying downward pressure to the major portion of the top of said core to bend the core and force the bottom face thereof against said concave die face; pouring liquid in the die to cover said cocave die face and also the portion of the core adjacent said die face; freezing the liquid to provide a continuous frozen mass which fastens said bent core and die together; discontinuing the application of said downward pressure to the top of said core to thereby leave the top of the core freely exposed; cutting a thin slice from the top of said bent core while the core is fast to said die to provide a substantially plane top face on the bent core; and heating said frozen mass to liquify it and thereby release the bottom face of the core from said concave die face and permit the major portion of the core to rise and provide a top core contour of said compound curvature.

7. The method of shaping the top of a honeycomb core consisting of a plurality of interconnected thin-walled cells having vertical metal walls to a convex contour which comprises the steps of placing the core on a die having a concave curved upper face; substantially covering the top of said core with a thin rubber pad; applying sufficient downward pressure to said pad to bend said core and press its bottom face into contact with said upper die face; bonding the lower end of the bent core to said die; removing said rubber pad from the top of the core thereby leaving the top of the core freely exposed; cutting a thin slice from the top of the bent core while the core is fast to said die to provide a plane top face on the bent core; and releasing the lower end of the bent core from the die.

References Cited in the file of this patent

UNITED STATES PATENTS

| | | |
|---|---|---|
| 1,787,513 | Cromwell | Jan. 6, 1931 |
| 2,167,215 | Leary | July 25, 1939 |
| 2,280,359 | Trudell | Apr. 21, 1942 |
| 2,586,532 | Granfield | Feb. 19, 1952 |
| 2,628,417 | Peyches | Feb. 17, 1953 |
| 2,654,686 | Hansen | Oct. 6, 1953 |
| 2,731,713 | Schaefer | Jan. 24, 1956 |